March 13, 1962 F. P. TAMBURRO 3,024,748
TRIMMER MECHANISM
Filed Oct. 9, 1959
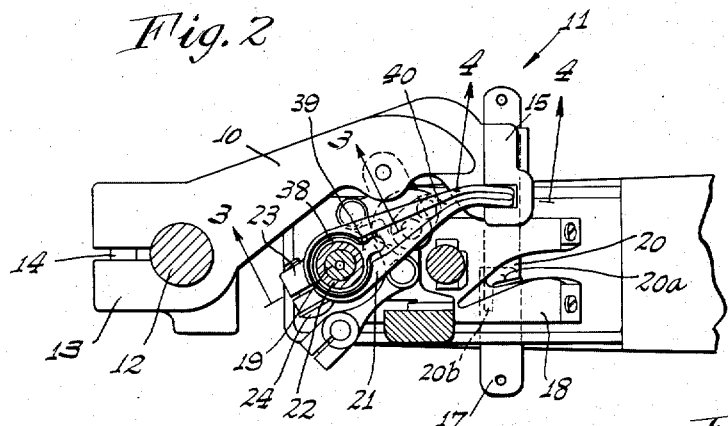
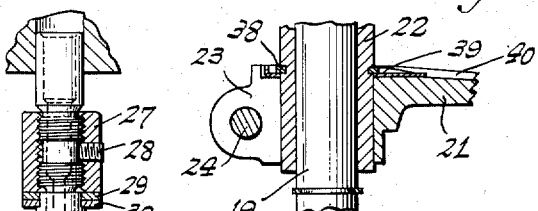
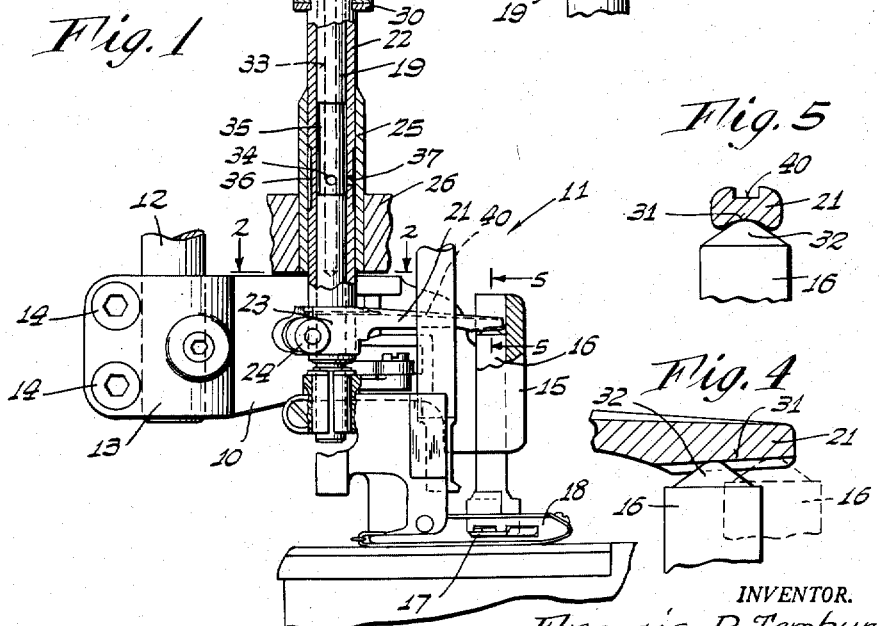
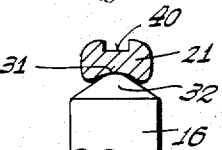
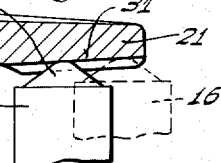
INVENTOR.
Francis P. Tamburro
BY
Johnson and Kline
ATTORNEYS

United States Patent Office 3,024,748
Patented Mar. 13, 1962

3,024,748
TRIMMER MECHANISM
Francis P. Tamburro, Teaneck, N.J., assignor to Willcox & Gibbs Sewing Machine Co., New York, N.Y., a corporation of New York
Filed Oct. 9, 1959, Ser. No. 845,356
9 Claims. (Cl. 112—123)

This invention relates to improvements in trimmer mechanisms for flatlock sewing machines or the like and, more particularly, constitutes an improvement over the invention disclosed in my copending application Serial No. 502,421, filed April 19, 1955 now Patent No. 2,910,024, granted October 27, 1959.

It is an object of the invention to provide a trimmer mechanism for sewing machines, of the type wherein the trimmer arm and drive therefor are mounted independently of the presser foot bar, in which there are improved means for presenting the cutter blade to the fixed trimming blade in shearing position.

It is also an object of the invention to provide a trimming mechanism having a trimmer arm mounted independently of the presser foot bar of the sewing machine, in which the cutter blade is carried by the trimmer arm for movement into and out of shearing position relative to a fixed blade carried by the presser foot of the sewing machine and is pressed into cutting engagement therewith in shearing position by means rotatably carried by the presser foot bar.

Another object of the invention, is to provide a trimming mechanism having a trimmer arm mounted independently of the presser foot bar carrying a cutting blade adapted to be moved into shearing position relative to a fixed blade carried by the presser foot in which means rotatably carried by the presser foot bar acts to apply a maximum pressure to the cutting blade to press it into such engagement with the fixed blade only at the time said blades are in shearing position to effect a desired cutting operation and to relieve the pressure between said blades in the non-shearing position thereof.

Still another object of the invention is to provide a trimmer mechanism for sewing machines having an oscillating trimmer arm counted independently of the presser foot bar of the sewing machine and slidably carrying a cutter blade carrier having a cutter blade thereon, in which means rotatably carried by the presser foot bar cooperatively engage the cutter blade carrier for camming the cutter blade into said cutting engagement with a fixed blade as the trimmer arm oscillates the cutter blade into shearing position relative to the fixed blade.

It is further an object of the invention to provide a trimmer mechanism for sewing machines having an oscillating trimmer arm mounted independently of the presser foot bar carrying a slidably mounted cutter blade wherein rotatably mounted means cam the cutter blade into and out of pressing cutting engagement with a fixed blade as the trimmer arm oscillates into and out of shearing position.

It is still further an object of the invention to provide a trimmer mechanism wherein the cutting blade, carried by an oscillating trimmer arm mounted independently of the presser foot bar of the sewing machine, is pressed into cutting engagement with a fixed blade, in the shearing position of the blades, by a rotatable, independently mounted cam member which is driven by the trimmer arm.

Other objects and advantages of the invention will be apparent from the specification and claims when considered in connection with the attached sheet of drawings illustrating one form of the invention wherein like characters represent like parts and in which:

FIGURE 1 is a fragmentary elevational view, partially broken away and in section, showing a presser foot assembly and trimmer mechanism embodying the concepts of the invention;

FIG. 2 is a cross-sectional plan view taken in the direction of the arrows 2—2 in FIG. 1;

FIG. 3 is an enlarged fragmentary detailed view taken in the direction of the arrows 3—3 in FIG. 2;

FIG. 4 is an enlarged fragmentary detailed view taken in the direction of the arrows 4—4 in FIG. 2; and FIG. 5 is an enlarged fragmentary detailed view taken in the direction of the arrows 5—5 in FIG. 1.

As afore-noted, the present invention is an improvement on trimming mechanisms of the type disclosed in my copending application Serial Number 502,421, now Patent No. 2,910,024 to which reference may be made for the standard elements of the trimmer mechanism. According to the invention, and as shown in FIGS. 1 and 2 of the drawings, the trimmer arm 10 of a trimming mechanism 11 is mounted on a trimmer arm shaft 12 to be driven thereby. The shaft, which oscillates the arm in the operation of the trimming mechanism in timed relation to the operation of the sewing machine, is itself driven by any means (not shown) that are known to the art and preferably by those means disclosed in my copending application. The trimmer arm 10 is curved and one end is split and provided with a shaft receiving portion 13 to receive the end of the trimmer arm shaft 12. The shaft, which may be provided with means (not shown) for accurately positioning and locking the trimmer arm thereon, is locked in the shaft receiving portion 13 of the arm by bolts 14 threaded in the split section.

The trimmer arm is provided at its end directed away from trimmer arm shaft 12 with a cap 15 adapted to mount a cutter blade carrier 16, which is movable toward and away from a fixed blade 17 carried by a presser foot 18 at the end of the presser foot bar 19. The cutter blade carrier, which is in the form of a plunger slidable on the trimmer arm between the end thereof and the cap 15, has a cutter blade 20 connected thereto, in any manner known to the art, and may be provided with a projecting blade engaging shoe (not shown) of the type disclosed in my prior application for engaging the cutter blade and canting it into a position in which the cutting edge 20a thereof is moved into engagement with the fixed blade 17.

As shown in FIG. 2, the cutter blade 20 is provided with a projecting tang 20b which overlies the fixed blade 17 in all positions of movement of the trimmer arm and maintains the blade in relative cutting position.

It will be understood, as disclosed in my prior application, that the cap 15 may be adjustably mounted to properly position the cutter blade 20 with respect to the fixed blade to effect a cutting throughout the entire stroke of the cutter blade.

In order to maintain the cutter blade in cutting engagement with the fixed blade and to apply the desired pressure thereto against the fixed blade in shearing position, the present invention provides improved means for applying pressure to the plunger or cutter blade carrier 16. This means comprises a cutter blade pressure arm 21 fixedly mounted on an elongate sleeve 22 rotatably carried by the presser foot bar 19. The pressure arm, while it may be connected to sleeve 22 in any manner known to the art, in the illustrated form of the invention is provided with a split sleeve receiving portion 23 having a bore adapted to receive the end of the sleeve. The arm is locked on the end of sleeve 22 by means of a bolt 24 or the like threaded in the split section. The sleeve, with the presser foot bar 19 extending therethrough, is rotatably supported in a bushing 25 carried by the frame 26 of the sewing machine. Means in the form of a collar 27 are threaded onto the upper end of presser foot bar 19 for preventing upward axial displacement of sleeve 22 and for other purposes to be hereinafter explained. As shown in FIG. 1, the collar 27 is adjustable on the presser foot bar and is provided with blocking means in the form of a set screw 28 for locking the collar in adjusted position relative to the bar. Washers 29 and 30 are disposed between the end of sleeve 22 and collar 27 to facilitate the rotation of the sleeve on the presser foot bar and reduce friction between the end of the sleeve and the collar.

The pressure arm 21, which is of reduced cross-section at its outer end or the end directed away from sleeve 22, is provided with a cam surface 31 for engaging a cam follower 32 formed on the end of cutter blade carrier 16. As will be most clearly seen in FIGS. 4 and 5, the cam surface 31 is in the form of a groove that is upwardly, outwardly inclined toward the end of arm 21.

In the operation of trimmer mechanism 11, the trimmer arm shaft 12 oscillates trimmer arm 10 to move the cutter blade carrier 16 toward and away from fixed blade 17, thus moving the cutter blade 20 into and out of shearing position with respect to the fixed blade. As the trimmer arm 10 oscillates, the pressure arm 21 is driven by the engagement of cam follower 32 with cam 31 to rotate or oscillate about the axis of sleeve 22 on the presser foot bar 19. It will be understood that the relationship of cam surface 31 to cam follower 32, as shown in solid lines in FIG. 4, is such that, when the trimmer arm 10 has moved the cutter blade 20 into shearing position, the pressure applied to cutter blade carrier 16 by the pressure arm 21 will be sufficient to press the cutter blade into cutting engagement with the fixed blade. As the trimmer arm 10 oscillates to move the cutter blade 20 out of shearing position, the cam follower 32 moves toward the outer end of arm 21 or to the elevated portion of cam surface 31, as shown in dotted lines in FIG. 4, thereby relaxing the pressure applied to the cutter blade through the cutter blade carrier. The relative movement of the cam surface 31 and the cam follower 32 of cutter blade carrier 16 is the result of rotating the trimmer arm 10 and pressure arm 21 about separate axes of rotation, whereby their respective arcs of rotation will cross as the arms are oscillated. It should here be noted that the pressure applied by pressure arm 21 to plunger 16 may be adjusted to increase or decrease the pressure of cutter blade 20 on fixed blade 17 by adjusting the collar 27 to decrease or increase respectively, the upward movement of sleeve 22 on presser foot bar 19.

By means of the invention as above described, a desired amount of pressure may be imparted between the cutter blades in the shearing position thereof, which may be relaxed as the blades are moved out of shearing position, thereby decreasing the strain on the cutter blade and substantially reducing breakage thereof.

According to the invention, means are provided for lubricating the trimmer mechanism. As is most clearly shown in FIG. 1, the presser foot bar 19 is formed with an axial bore 33 opening outwardly of the upper end of the bar and is provided with a transverse bore 34 communicating the axial bore with the interior of sleeve 22. Such communication is facilitated by providing the presser foot bar with an intermediate portion 35 of reduced diameter in the area of bore 34. Sleeve 22 is similarly formed with a reduced outer wall portion 36 substantially overlying the reduced portion of bar 19 and is formed with an opening 37 extending therethrough. It will be understood that in order to lubricate the bearing surface between sleeve 22, and bar 19 and between the sleeve and the bushing 25, lubricating material will be inserted in the axial bore of the bar to be transmitted first through the opening 34 to the surfaces between the sleeve and the bar and then through the opening 37 to the surfaces between the sleeve and the bushing. The overflow lubricating material, which flows down the outer surface of the sleeve, as most clearly seen in FIGS. 2 and 3, is deflected by washer 38 into a lubricating pan 39 and is thereafter directed into a channel 40, formed in the top of pressure arm 21. The lubricating material travels along channel 40 to the cutter blade carrier 16 and lubricates the same to facilitate the movement thereof in the end of trimmer arm 10.

Thus, among others, the several objects and advantages of the invention as aforenoted are achieved. Obviously numerous changes in the structure may be resorted to without departing from the spirit of the invention as defined by the claims.

I claim:

1. A trimmer mechanism for use in a sewing machine having a frame carrying a presser foot bar having a presser foot thereon comprising a fixed blade on the presser foot, a trimmer arm mounted on the frame independently of the presser foot bar and presser foot, said arm having a cutter blade carrier mounted thereon for sliding movement toward and away from said fixed blade, said carrier having a cutter blade thereon cooperating with said fixed blade and adapted to trim the edges of the fabric feeding under the presser foot, means oscillating said trimmer arm for moving said cutter blade into and out of shearing position with respect to said fixed blade in timed relation to the operation of the sewing machine, and cam means rotatably mounted independently of said trimmer arm and cooperating with said cutter blade carrier for gradually pressing said cutter blade into cutting engagement with said fixed blade in the shearing position thereof.

2. A trimmer mechanism for use in a sewing machine having a frame carrying a presser foot bar having a presser foot thereon comprising a fixed blade on the presser foot, a trimmer arm mounted on the frame independently of the presser foot bar and presser foot, said arm having a cutter blade carrier mounted thereon for sliding movement toward and away from said fixed blade, said carrier having a cutter blade thereon cooperating with said fixed blade and adapted to trim the edges of the fabric feeding under the presser foot, means oscillating said trimmer arm for moving said cutter blade into and out of shearing position with respect to said fixed blade in timed relation to the operation of the sewing machine, and cam means rotatably carried by said presser foot bar and cooperating with said cutter blade carrier for gradually pressing said cutter blade into cutting engagement with said fixed blade in the shearing position thereof.

3. A trimmer mechanism for use in a sewing machine having a frame carrying a presser foot bar having a presser foot thereon comprising a fixed blade on the presser foot, a trimmer arm mounted on the frame independently of the presser foot bar and presser foot, said arm having a cutter blade carrier mounted thereon for sliding movement toward and away from said fixed blade, said carrier including a plunger provided with a cam follower at one end and having a cutter blade at the opposite end cooperating with said fixed blade and adapted to trim the edges of the fabric feeding under the presser foot, means oscillating said trimmer arm for moving said cutter blade into and out of shearing position with respect to said fixed blade in timed relation to the operation of the sewing machine, and means rotatably carried by said presser foot bar having a cam cooperating with said cutter blade carrier for pressing said cutter blade into cutting engagement with said fixed blade in the shearing position thereof.

4. A trimmer mechanism for use in a sewing machine having a frame carrying a presser foot bar having a presser foot thereon comprising a fixed blade on the presser foot, a trimmer arm mounted on the frame independently of the presser foot bar and presser foot, said arm having a cutter blade carrier mounted thereon for sliding movement toward and away from said fixed blade, said carrier including a plunger provided with a cam follower at one end and having a cutter blade at the opposite end cooperating with said fixed blade and adapted to trim the edges of the fabric feeding under the presser foot, means oscillating said trimmer arm for moving said cutter blade into and out of shearing position with respect to said fixed blade in timed relation to the operation of the sewing machine, and a pressure arm rotatably carried by said presser foot bar having a cam cooperating with said cutter blade carrier for pressing said cutter blade into cutting engagement with said fixed blade in the shearing position thereof.

5. A trimmer mechanism for use in a sewing machine having a frame carrying a presser foot bar having a presser foot thereon comprising a fixed blade on the presser foot, a trimmer arm mounted on the frame independently of the presser foot bar and presser foot, said arm having a cutter blade carrier mounted thereon for sliding movement toward and away from said fixed blade, said carrier including a plunger provided with a cam follower at one end and having a cutter blade at the opposite end cooperating with said fixed blade and adapted to trim the edges of the fabric feeding under the presser foot, means oscillating said trimmer arm for moving said cutter blade into and out of shearing position with respect to said fixed blade in timed relation to the operation of the sewing machine, and means rotatably carried by said presser foot bar and cooperating with said cutter blade carrier for pressing said cutter blade into cutting engagement with said fixed blade in the shearing position thereof, said means including a sleeve rotatably mounted by said presser foot bar having a pressure arm connected thereto, said pressure arm being provided with a cam adapted to operatively engage said cam follower.

6. A trimmer mechanism as in claim 5 in which there are means for adjustably positioning said sleeve relative said presser foot bar, whereby the pressure applied to said cutter blade carrier is controlled.

7. A trimmer mechanism as in claim 5 in which there is a collar adjustably connected to said presser foot bar for preventing the upward axial movement of said sleeve, whereby the pressure applied to said cutter blade carrier is controlled.

8. A trimmer mechanism for use in a sewing machine having a frame carrying a presser foot bar having a presser foot thereon comprising a fixed blade on the presser foot, a trimmer arm mounted on a trimmer arm shaft independently of the presser foot bar and presser foot, said arm having a cutter blade carrier mounted thereon for sliding movement toward and away from said fixed blade, said carrier including a plunger provided with a cam follower at one end and having a cutter blade at the opposite end cooperating with said fixed blade and adapted to trim the edges of the fabric feeding under the presser foot, means rotating said trimmer arm shaft for oscillating said trimmer arm in an arc around said shaft for moving said cutter blade into and out of shearing position with respect to said fixed blade in timed relation to the operation of the sewing machine, and a pressure arm rotatably carried by said presser foot bar having an inclined cam surface cooperating with said cutter blade carrier for pressing said cutter blade into cutting engagement with said fixed blade in the shearing position thereof, said pressure arm being rotated about said presser foot bar by said trimmer arm and having an arc of rotation adapted to intersect the arc of rotation of said trimmer arm, whereby said cam follower moves back and forth across said cam surface.

9. A trimmer mechanism for use in a sewing machine having a frame carrying a presser foot bar having a presser foot thereon comprising a fixed blade on the presser foot, a trimmer arm mounted on the frame independently of the presser foot bar and presser foot, said arm having a cutter blade carrier mounted thereon for sliding movement toward and away from said fixed blade, said carrier including a plunger provided with a cam follower at one end and having a cutter blade at the opposite end cooperating with said fixed blade and adapted to trim the edges of the fabric feeding under the presser foot, means oscillating said trimmer arm for moving said cutter blade into and out of shearing position with respect to said fixed blade in timed relation to the operation of the sewing machine, means rotatably carried by said presser foot bar and cooperating with said cutter blade carrier for pressing said cutter blade into cutting engagement with said fixed blade in the shearing position thereof, said means including a sleeve rotatably carried by said presser foot bar having a pressure arm connected thereto providing a cam adapted to operatively engage said cam follower, and means for lubricating said trimmer mechanism, said lubricating means including means for providing lubricating material between said presser foot bar and said sleeve and means for directing the excess lubricating material therefrom to said cutter blade carrier.

References Cited in the file of this patent
UNITED STATES PATENTS

| | | |
|---|---|---|
| 1,403,807 | Moffatt | Jan. 17, 1922 |
| 1,410,057 | Gatchell | Mar. 21, 1922 |
| 1,733,867 | Davidson | Oct. 29, 1929 |
| 1,827,577 | Hanneman | Oct. 13, 1931 |
| 1,933,038 | Zeier et al. | Oct. 31, 1933 |

UNITED STATES PATENT OFFICE
CERTIFICATE OF CORRECTION

Patent No. 3,024,748                                            March 13, 1962

Francis P. Tamburro

It is hereby certified that error appears in the above numbered patent requiring correction and that the said Letters Patent should read as corrected below.

Column 1, line 43, for "counted" read -- mounted --.

Signed and sealed this 3rd day of July 1962.

(SEAL)
Attest:

ERNEST W. SWIDER
Attesting Officer

DAVID L. LADD
Commissioner of Patents